Z. P. CANDEE.
CLUTCH MECHANISM.
APPLICATION FILED JULY 2, 1908.
920,726.
Patented May 4, 1909.
2 SHEETS—SHEET 2.
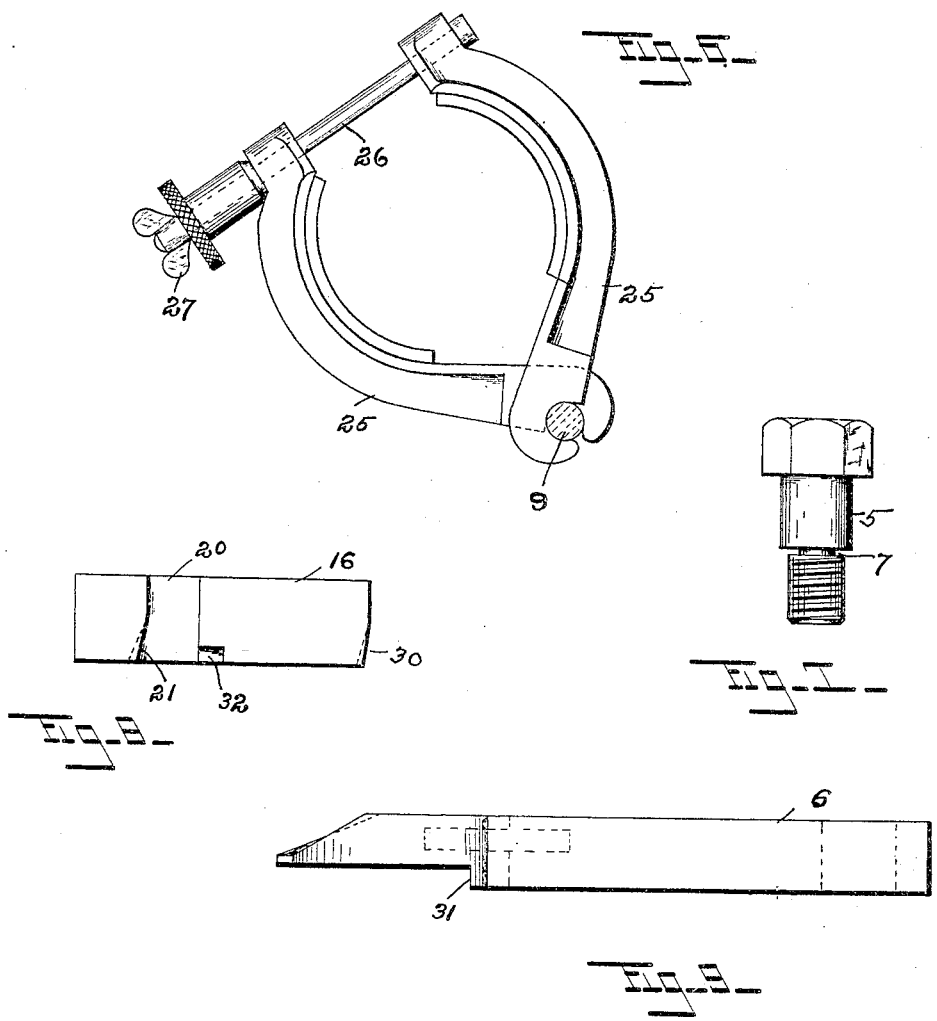
WITNESSES:
Florence H. Monk.
Frank R. Lawrence.
INVENTOR.
Zenas P. Candee
BY George E. Hall
ATTORNEY.

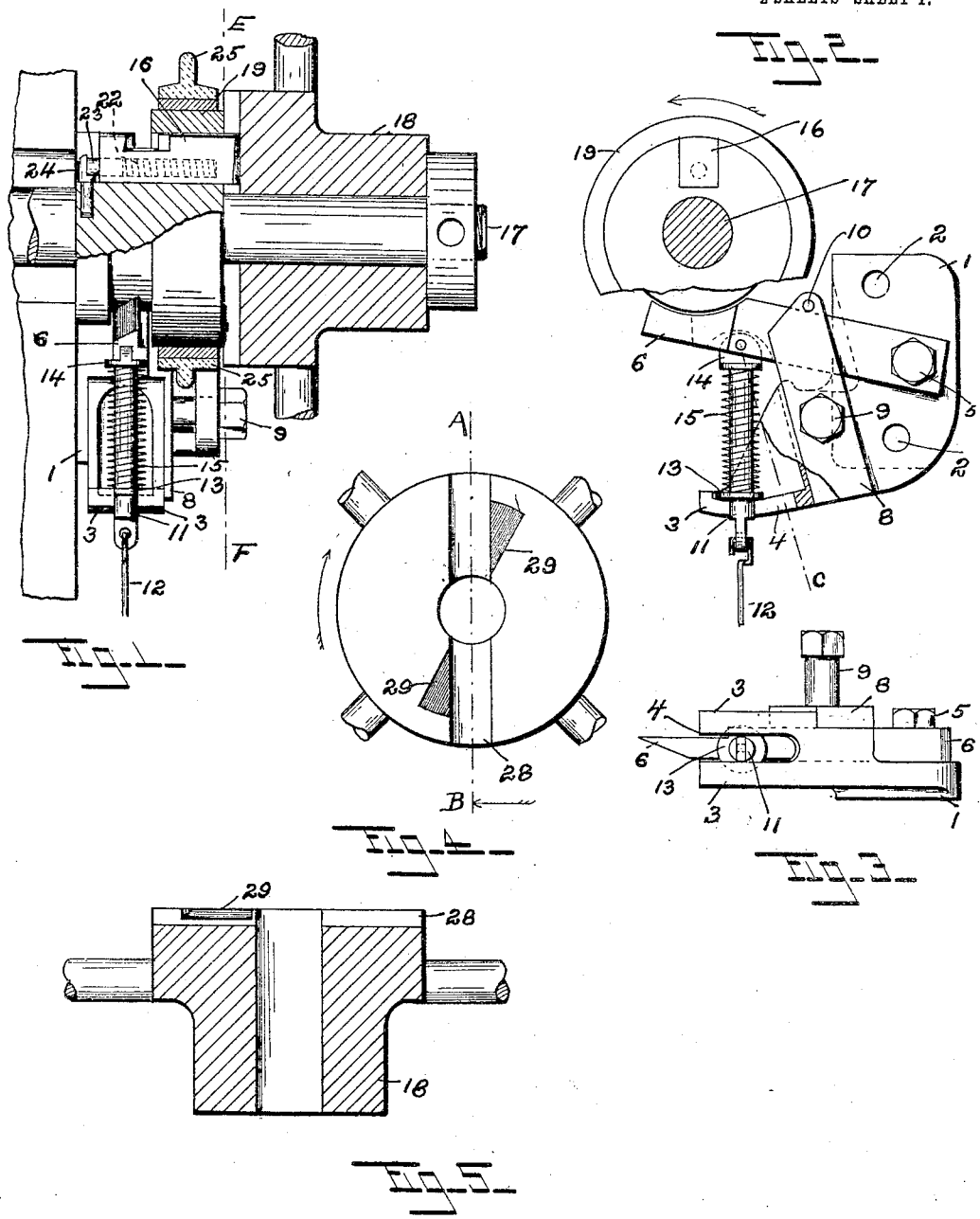

ZENAS P. CANDEE, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

CLUTCH MECHANISM.

No. 920,726.　　　Specification of Letters Patent.　　　Patented May 4, 1909.

Application filed July 2, 1908. Serial No. 441,635.

*To all whom it may concern:*

Be it known that I, ZENAS P. CANDEE, a citizen of the United States, residing at Waterbury, in the county of New Haven and State of Connecticut, have invented certain new and useful Improvements in Clutch Mechanism, of which the following is a specification, reference being had therein to the accompanying drawings.

My invention relates to new and useful improvements in clutch mechanisms, and has for its object, among other things, to provide a device wherein all of the clutch parts, not mounted on the crank shaft, will be connected with a separable member, so that all may be applied at one time as a unit, and to provide means whereby the key will enter the driving wheel gradually and without shock.

To these, and other ends, my invention consists in the clutch mechanism, having certain details of construction and combinations of parts, as will be hereinafter described and more particularly pointed out in the claims.

Referring to the drawings, in which like numerals of reference designate like parts in the several figures; Figure 1 is a front elevation of my improved device with a portion of the crank shaft and wheel; Fig. 2 is a side elevation thereof; Fig. 3 is an end view looking from the bottom of Fig. 2; Fig. 4 is an elevation of one face of the driving wheel hub; Fig. 5 is a sectional view thereof upon line A—B of Fig. 4; Fig. 6 is a side elevation of the friction arms; Fig. 7 is an elevation of the lever stud; Fig. 8 is a plan view of the key; and Fig. 9 is a plan view of the clutch lever.

In the practice of my invention I provide a plate 1, which is secured to the body of the machine by bolts (not shown) which pass through holes 2 therein, and having two parallel arms 3—3 projecting therefrom with an opening 4 therebetween. Pivotally secured to the plate 1 by the bolt 5 is the clutch lever 6, said bolt being grooved at 7 to weaken it so that if perchance the clutch lever, key or other mechanism connected therewith should become clogged, the bolt will snap off at this point, relieving the strain and reducing the liability of injury to a minimum. Lateral movement of the clutch lever 6 is prevented by the plate 8, which is secured to the plate 1 by the bolt 9 and having a stop pin 10 therein which limits the movement of said clutch lever in one direction. Pivotally connected with the clutch lever 6 is the rod 11 which projects through the opening 4 between the arms 3—3, and to the free end of which is connected the treadle rod 12. Surrounding this rod between the collar 13 thereon, which rests upon the top side of the arms 3—3, and the head 14, is a coil spring 15, the tension of which is exerted against said clutch lever so as to normally hold it against the stop pin 10.

In practice, the plate 1 is attached to the machine in the path of the clutch key 16, as shown in Fig. 1, wherein the numeral 17 designates the crank shaft, 18 the hub of the driving wheel and 19 the friction collar. The key 16 is slidable axially in a groove in the crank shaft 17, as is common in the art, and has a groove 20 therein with a beveled face 21 and is moved in a direction away from the machine by a spring 22 engaging the bottom of a hole, in said key, at one end, and a plug 23 at the other end, which plug abuts against a stud 24 in the crank shaft 17. In Figs. 1 and 2 the clutch lever is shown in a position wherein it will engage the key and move the same laterally in the crank shaft out of the wheel hub and is moved out of this position and the path of the key by the treadle rod 12, against the tension of the spring 15, which returns it to its original position as soon as the pressure upon the treadle is removed. It is highly desirable that the rod 11 should be in substantially the same line as the treadle rod 12 to operate the clutch lever effectually, and to accommodate this device for machines occupying a position other than vertical, as an inclined press for example, the rod is mounted so as to be moved about its pivot connection with the clutch lever 6 from the position shown by full lines in Fig. 2 to that illustrated by the center line in the same figure. The tension of the spring 15 upon the clutch lever 6 is the same whatever the relative position of the rod 11, as said spring always maintains its engagement with the collar 13 and head 14.

All of the parts operating the clutch key, being mounted upon a single plate, can be attached to a machine as a unit with little or no difficulty and with great economy of time. The friction mechanism, which comprises the arms 25, bolt 26 and nut 27, is also connected with this plate, being hung on the bolt 9.

The hub 18 of the driving wheel is provided with a slot 28 in one face thereof and having the beveled faces 29 in the opposite walls thereof. The inner end of the key 16 is also provided with a beveled face 30. The beveled faces 29 and 30 contact with each other during the rotation of the hub 18, and by reason thereof the key 16 moves axially within the crank shaft and gradually enters the slot 28 before the full width of the key is in register with said slot, at which time only a limited endwise movement of the key is necessary for it to bottom therein. Heretofore it has been the practice to provide beveled faces on the hub of the wheel, as shown, but by beveling the end of the key in addition, as in my invention, the preliminary movement of the key is materially increased and reduces in the same proportion the final movement of the key, thereby reducing the shock upon the parts and greatly increasing the efficiency of the clutch.

I have embodied in this invention means for preventing the press from repeating when the clutch lever is up and the key disengaged from the wheel, which consists in providing the clutch lever 6 with a shoulder 31 and the key 16 with a notch 32. If at any time upon the withdrawal of the key there is energy enough in the press and the friction is sufficiently loose, the notch 32 on the key will engage the shoulder 31 upon the clutch lever and prevent the same passing the lever until released therefrom through the treadle. Without the shoulder 31, the shaft might continue to rotate and the key pass beyond the lever and enter the wheel at its next revolution, when the slot 28 is in register therewith, making another complete stroke.

There are minor changes and alterations that can be made within my invention, aside from those herein suggested, and I would therefore have it understood, that I do not limit myself to the exact construction herein shown and described, but claim all that falls fairly within the spirit and scope of my invention.

Having described my invention, what I claim as new and desire to secure by Letters Patent, is:—

1. Mechanism for moving a key axially in a rotary part and mounted as a unit upon a detachable plate, comprising in combination with said plate; a clutch lever mounted thereon; a rod connected with said clutch lever; a spring encircling said rod between said clutch lever and plate; and means connected with said rod whereby the same may be moved against the tension of said spring.

2. Mechanism for moving a key axially in a rotary part and mounted as a unit upon a detachable plate secured to a part within which said rotary part is journaled, and comprising in combination; a detachable plate having an opening upon one side thereof; a clutch lever mounted thereon; a rod connected with said clutch lever and projecting through said opening; a spring between said clutch lever and plate; and means connected with said rod whereby the same may be moved against the tension of said spring.

3. In a device of the character described, the combination with a plate having parallel arms projecting therefrom with an opening therebetween; of a clutch lever mounted on said plate; a rod connected with said clutch lever and projecting through the opening between said arms; a collar upon said rod contacting with said arms; and a spring encircling said rod between said collar and clutch lever.

4. In a device of the character described, the combination with the plate 1 having the opening 4 therein; of the clutch lever 6 mounted upon the bolt 5 in said plate; means for preventing the lateral movement of said lever; a rod 11 connected with said lever and projecting through said opening; and a spring 22 between the said clutch lever and said plate.

5. In a device of the character described, the combination with the plate, substantially as described; of a clutch lever, having a shoulder thereon, mounted on said plate and held against lateral movement; a rod connected with said lever and projecting through an opening in said plate; a rotary shaft; a wheel on said shaft; and a key, having a notch in one side thereof, in the path of the shoulder on said lever, movably mounted in said shaft.

In testimony whereof I affix my signature in presence of two witnesses.

ZENAS P. CANDEE.

Witnesses:
J. M. GALLOND,
M. J. NOONAN.